United States Patent [19]

MacDougall

[11] Patent Number: 5,458,844
[45] Date of Patent: Oct. 17, 1995

[54] METHOD OF ROTARY MOULDING A SHELL STRUCTURE HAVING AN INTEGRAL SUPPORT STRUCTURE

[75] Inventor: Gary D. MacDougall, East Tamaki, New Zealand

[73] Assignee: Allied Plastics International Limited

[21] Appl. No.: 105,720

[22] Filed: Aug. 12, 1993

[51] Int. Cl.[6] .................................................. B29C 65/00
[52] U.S. Cl. ........................ 264/310; 264/248; 264/296
[58] Field of Search ................................. 264/310, 311, 264/301, 302, 294, 296, 248, 545

[56] References Cited

U.S. PATENT DOCUMENTS

| | | | |
|---|---|---|---|
| 1,506,062 | 8/1924 | Henker | 264/310 |
| 1,592,673 | 7/1926 | Nichols | 264/310 |
| 2,839,788 | 6/1958 | Dembiak | 264/310 |
| 3,663,680 | 5/1972 | Ringdal | 264/310 X |
| 3,742,995 | 7/1973 | Confer et al. | 264/310 |
| 4,247,279 | 1/1981 | Masters | 425/430 |
| 4,390,383 | 6/1983 | van Dongeren | 264/310 |
| 4,773,844 | 9/1988 | Bartels et al. | 264/310 |
| 4,883,626 | 11/1989 | Weideman et al. | 264/310 |
| 4,971,737 | 11/1990 | Infanti | 264/313 |
| 5,039,297 | 8/1991 | Masters | 264/310 |
| 5,217,667 | 6/1993 | Griffith | 264/310 |
| 5,225,214 | 7/1993 | Filion | 264/310 |
| 5,234,653 | 8/1993 | Buzzoni et al. | 264/310 |
| 5,277,861 | 1/1994 | Zilbert | 264/310 |
| 5,290,499 | 3/1994 | Tischler | 264/310 |

Primary Examiner—Karen Aftergut
Attorney, Agent, or Firm—Abelman, Frayne & Schwab

[57] ABSTRACT

A method of forming a shell structure using rotary moulding techniques where two halves of the shell are moulded together and then joined when the two halves of the shell are in a molten state. The method is particularly useful for moulding one-piece boat hulls.

21 Claims, 3 Drawing Sheets

METHOD OF ROTARY MOULDING A SHELL STRUCTURE HAVING AN INTEGRAL SUPPORT STRUCTURE

TECHNICAL FIELD

This invention relates to a moulded shell and method of forming thereof.

BACKGROUND ART

The invention may be particularly applicable to a moulded boat hull comprising an outer shell and an inner shell.

One generally known method of forming a boat hull from moulded plastic shells it to mould separate outer and inner shells and then to join the two shells together either by using adhesives, or by fastening devices such as bolts, screws and the like. This method of construction enables the internal surfaces of the hull to be inspected for quality and thickness before assembly, and enables various shaped sections of the hull to be joined together where required to obtain the necessary strength. In particular, it enables hollow girder sections to be formed lengthwise along the hull to provide rigidity of the hull. However with conventional methods of attachment of the outer and inner shells using fastening devices there are inevitably stress concentrations in the regions of the joints, and in the case of using adhesives there is the possibility of imperfect jointing also leading to local areas of stress concentration. As a result the joints are susceptible to fatigue failure. Consequently these methods of construction are not satisfactory for hulls of larger high powered vessels subjected to high operational loadings over long periods of time. It is therefore desirable with moulded hulls, to have an integral construction to facilitate even load distribution throughout the structure thereby minimising problems of failure at regions of attachment.

Another drawback with the conventional method of construction is that it involves two processes. The first process being to form the two shells and the second process being to join the two shells together. Consequently the method is time consuming and hence costly.

An alternative method of construction that reduces production time and partially overcomes the problem of joining is the rotary moulding process. With the rotary moulding process a complete shell can be moulded in a single step thereby speeding up production and reducing labour costs. With this method, moulds for outer and inner shells of the hull, such as the hull bottom and stern, and the hull decking, seating and flooring sections respectively are made so that they can be attached together to form a single hollow mould.

In the process, a rotary plastic moulding powder such as Dupont 8405 moulding powder of a predetermined amount is first poured into one of the shell moulds. Then after attaching the moulds together, the resulting hollow mould is heated while being rotated and tilted so that the powder can flow over all internal surfaces of the mould, sticking to the internal surfaces as it melts under heat from the mould and forming into a homogeneous plastic. By programming the sequence and degree of rotation and tilting, the whole of the internal surfaces of the mould can be evenly covered with plastic to a predetermined thickness so that an integral hollow shell is formed. With this method of construction, the peripheral edges of the moulded hull, that were necessarily bonded or fastened together in the conventional two process method, can be formed as homogeneous integral parts of the hull, thereby ensuring even stress distribution in these regions to that fatigue failure is minimised. Furthermore certain other sections such as those around centreboard wells where the bottom surface of the hull is not continuous can also be formed as homogeneous integral parts of the hull connecting the inner and outer shells of the hull together.

With the above rotary moulding technique however, due to the requirement of allowing the plastic to flow in powder form over all the surfaces to be coated with plastic, it has not been possible to form internal sections of homogeneous plastic such as girder sections connecting the inner and outer shells where one of the surfaces of the shell is continuous.

It is an object of the present invention to provide a method of forming a shell structure that addresses the above problems and difficulties or at the very least offers a useful choice.

It is a further object of the present invention to provide a moulded plastic shell formed by such a method.

DISCLOSURE OF INVENTION

According to one aspect of the present invention there is provided a method of forming a shell structure using rotary moulding techniques as described herein including the steps of:

(a) aligning oppositely disposed moulds in a spaced apart relationship, said moulds being shaped with complimentary peripheral edges and one or both of said moulds being shaped to create a stiffening member in the shell structure formed on the mould or moulds, (b) providing a peripheral member which covers a peripheral gap between peripheral edges of the spaced apart moulds, (c) moulding a shell from molten plastic material on opposed surfaces of the moulds and the peripheral member, and (d) advancing the moulds towards each other whilst the plastic material is in the molten state so that contact is made between the molten material in the vicinity of the stiffening member to merge and unify the shell, whilst material at the peripheral edges is displaced with said advancement.

According to another aspect of the present invention there is provided a method of forming a shell structure using rotary moulding techniques as aforesaid wherein said shell structure comprises a boat hull, said oppositely disposed moulds comprise inner and outer shell moulds for said boat hull, and said inner mould is shaped to create at least one longitudinal stiffening member for said boat hull, characterised by the steps of:

(a) aligning said inner shell mould and said outer shell mould in a spaced apart relationship such that peripheral portions thereof are in alignment, (b) providing said peripheral member around the periphery of said inner and outer shell moulds such that the peripheral gap therebetween is covered, said peripheral member being arranged such that said oppositely disposed moulds may be advanced towards each other over a predetermined distance, (c) moulding a boat hull from molten plastic material on opposed surfaces of said inner and outer shell moulds and the peripheral member, (d) advancing the inner and outer shell moulds towards each other whilst the plastic material is in the molten state so that contact is made between the molten material on the inner and outer shell moulds in the vicinity of the stiffening member such that said molten material becomes homogeneous in the region of contact, whilst material at the peripheral edges is displaced with said advancement, (e) allowing said moulds to cool, (f) separating said inner and outer shell moulds leaving said boat hull supported in one or other of said moulds, and (g) removing said boat hull from said mould.

According to another aspect of the present invention there is provided a moulded plastic shell structure formed by said rotary moulding technique comprising opposing shells which are integrally joined around peripheral portions thereof and which are also integrally joined at adjacent regions within said periphery at a region of continuity of an outer surface of one of the shells.

According to another aspect of the present invention there is provided a moulded plastic shell structure as aforesaid wherein said shell structure comprises a boat hull and said opposing sections comprise inner and outer shells of said boat hull, wherein said inner shell is provided with at least one longitudinal stiffening member which is formed integral with said outer shell at a region of continuity of an outer surface of said outer shell.

With the above method of forming a shell structure such as a boat hull, at least one longitudinal stiffening member may be integrally formed between inner and outer shells by simultaneously moulding combined inner and outer shells of the hull by a rotary moulding process and then bringing the inner and outer shell moulds together so that adjacent surfaces in the vicinity of the stiffening member are merged and united together.

In this process the inner and outer shells may be held apart by a predetermined amount to provide space for the moulding powder to completely flow over all surfaces including the surface forming the stiffening member. With the shells held apart in this condition the peripheral edges may be temporarily sealed to prevent the moulding powder from escaping from the moulds. A possible sealing means may comprise peripheral plates fixed to peripheral edges of the inner and outer shell moulds so as to provide a seal to the moulding powder while allowing the moulds to be moved together. Any gap between these plates may be temporarily sealed with a high temperature sealant such as silicone. However any other suitable means may be used to provide a seal to maintain the powder or molten plastic within the assembled moulds.

With the shells sealed around their periphery, they may then be tilted and rotated as one while being heated according to a predetermined cycle so that all internal surfaces are covered with molten plastic moulding material. The shells may then be brought together by a predetermined amount so that moulding material at specified internal regions of the inner and outer shells, such as regions having stiffening members, may be fused together to form a homogeneous connection.

In this way a moulded hull may be formed wherein predetermined internal regions may be homogeneously connected. This method has advantages over previous methods of hull construction in that it enables stiffening members to be located as required within the hull and homogeneously connected to the hull shell, thereby reducing susceptibility to joint failure inherent in bonded or fastened joints and the like. Furthermore, by using a rotary moulding process with a predetermined operation cycle, the hull can be produced quickly and uniformly thereby reducing costs and enhancing quality control.

BRIEF DESCRIPTION OF DRAWINGS

Aspects of the present invention will now be described by way of example only with reference to the accompanying drawings in which.

BEST MODES FOR CARRYING OUT THE INVENTION

Figure 1:
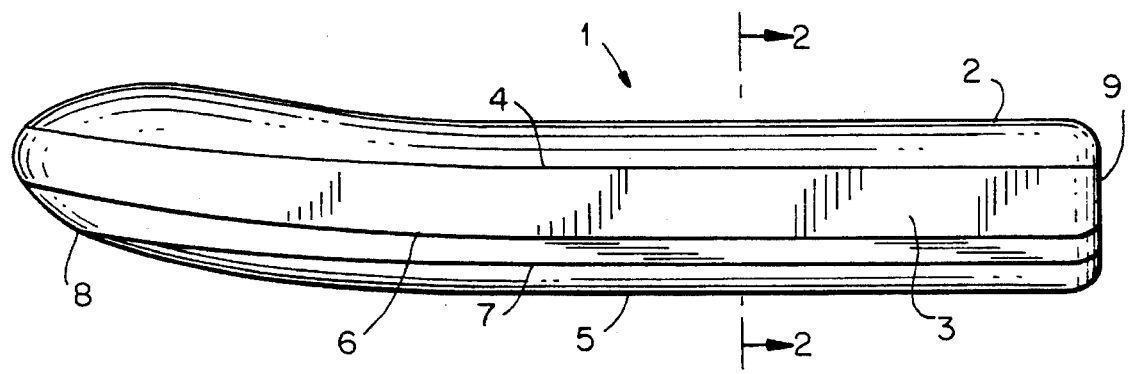
FIG. 1 is a general layout of a boat hull according to a possible embodiment of the present invention.

With respect to FIG. 1 of the drawings there is provided a hull for a power boat generally indicated by arrow 1. The hull 1 is formed from a mouldable plastic material and comprises an inner shell 2 and an outer shell 3. The inner shell 2 is joined to the outer shell 3 along a joint line 4. The outer shell 3 comprises a keel 5 and planing strakes 6 and 7 disposed between the keel 5 and joint line 4 and extending longitudinally from the region of the bow 8 to the region of the stern 9 of the hull 1.

Figure 2:
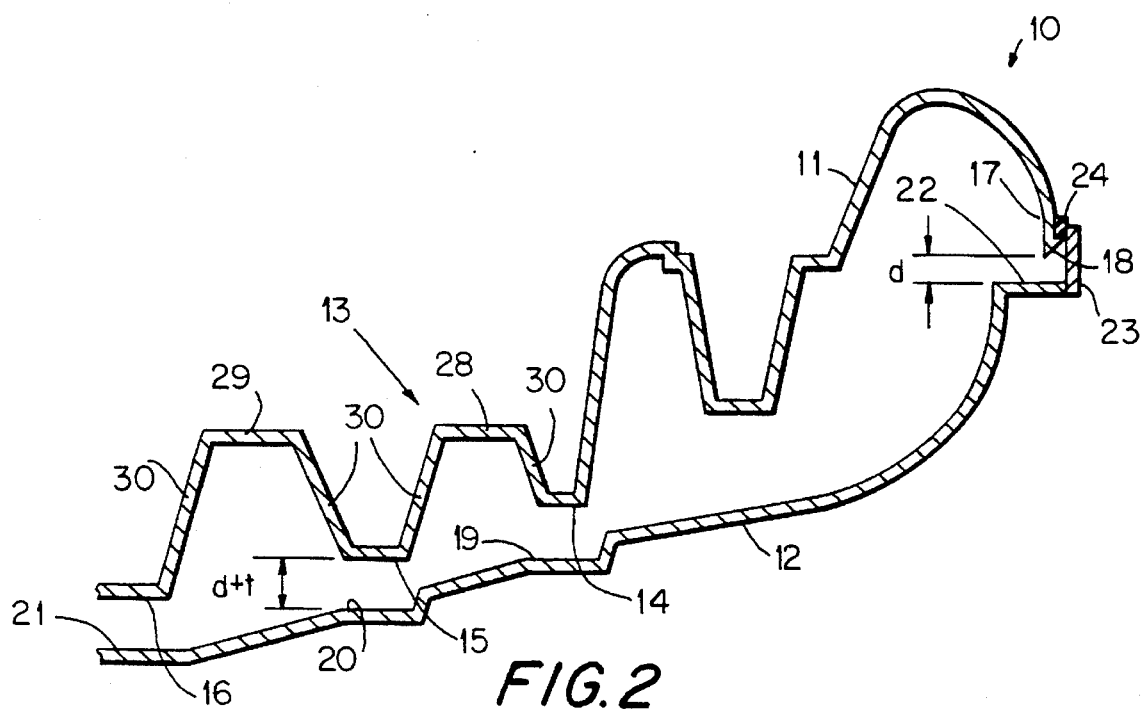
FIG. 2 is a cross sectional view, corresponding to a half section at A—A of FIG. 1, showing inner and outer shell moulds for moulding the boat hull of FIG. 1, the inner shell mould and outer shell mould being arranged in a separated condition for rotary moulding.

A hull such as that shown in FIG. 1 is formed by means of a shell mould generally indicated by arrow 10 in FIG. 2. For convenience, only a half section of the mould 10 is shown as viewed at a location corresponding to section A—A in FIG. 1. The mould 10 comprises an inner shell mould 11 and an outer shell mould 12.

The inner shell mould 11 is shaped so as to form an inner shell of a boat hull and comprises hull stiffening members generally indicated by arrow 13 extending along a longitudinal axis of the mould 10, the stiffening members 13 having lower faces 14, 15 and 16, upper flanges 28, 29 and intermediate webs 30. Hence, the stiffening members provide a series of internal supports with their lower faces 14, 15, 16 being integrally moulded to and extending inwardly from the interior surface of the outer hull 12, and having spaced intermediate webs 30, with freely extending flanges 28, 29 at their opposite ends. An inner parting plate 17 with a wedge shaped protruding, rim or flange, 18 inclined to face outwards is provided substantially around the entire peripheral edge of the inner shell mould 11.

The outer shell mould 12 is shaped so as to form the outer shell 3 of the boat hull 1, with strake faces 19 and 20 for forming the planing strakes 6 and 7 of FIG. 1, and keel face 21 for forming the keel 5 of FIG. 1. The upper peripheral edge of the outer shell mould 12 is formed as a substantially planar mating surface 22. Around the peripheral edge of the mating surface 22 is formed an outer parting plate 23 disposed substantially perpendicular to the mating surface 22.

The inner shell mould 11 and outer shell mould 12 are constructed such that when they are disposed adjacent to each other, the outermost edge of the wedge shaped rim 18 of the inner parting plate 17 is in sliding contact with an inner surface of the outer parting plate 23.

In FIG. 2 the inner shell 11 and outer shell 12 are shown separated from each other by means of a suitable separation mechanism (not shown in the figure) such that a predetermined distance "d" is obtained between a bottom edge of the wedge shaped rim 18 and the mating surface 22, and such that the strake faces 19 and 20 and the keel face 21 are respectively separated from the lower faces 14, 15 and 16 of the stiffening members 13 by a distance "d+t" where "t" is the required final thickness of plastic in these regions. With the inner and outer shell moulds 11 and 12 assembled in this condition, moulding powder which has been poured into one of the shell moulds before assembly, is free to flow over the entire internal surface of the inner shell mould 11 and the outer shell mould 12 as the assembled mould 10 is tilted and rotated by a suitable mechanism (not shown in the drawings). To ensure that the moulding powder does not leak out between the contacting edges of the wedge shaped rim 18 and the outer parting plate 23, this area may be sealed with a heat resistant flexible sealant 24 such as a silicone sealer.

The assembled mould 10 filled with a predetermined quantity of moulding powder is then heated by a suitable means, such as by a gas fired oven into which the assembled mould 10 may be placed, to a predetermined temperature and is rotated and tilted according to a predetermined program cycle. This ensures that the powder contained within the assembled mould 10 flows over the entire internal surface of the inner shell mould 11 and outer shell mould 12 and melts to form a skin of a predetermined thickness.

On completion of the program cycle, the separation mechanism is operated so that the inner shell mould 11 and the outer shell mould 12 may be brought together by the before mentioned predetermined amount "d" so that the bottom edge of the wedge shaped rim 18 abuts with the mating surface 22. At this time, any flexible sealant 24 around the peripheral joint is ruptured. During this process the mould plastic is still in a soft state. Consequently plastic formed on the surfaces of the inner face of the parting plate 23, the lower face of the wedge shaped rim 18 and a portion of the mating face 22 is squeezed towards the interior of the mould so that a section along the joint between the inner shell 11 and the outer shell 12 is formed to a predetermined thickness. This is shown as "w" in FIG. 3 which shows a half cross sectional view of the completed plastic hull view at A—A of FIG. 1.

Figure 3:
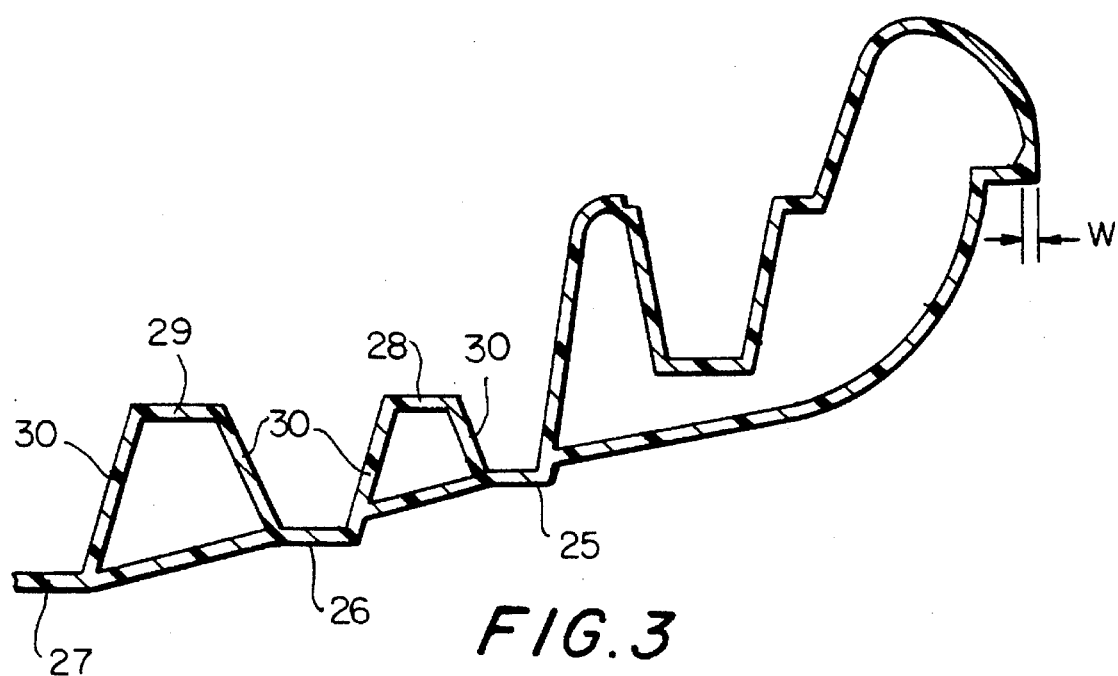
FIG. 3 is a cross sectional view at A—A in FIG. 1 of a completed boat hull formed by the moulds of FIG. 2 in accordance with a possible embodiment of the present invention.

Also at the time of bringing the inner shell 11 and outer shell 12 together, adjacent internal surfaces of the plastic mould material covering the lower faces 14, 15 and 16 of the stiffening members 13 and the strake faces 19 and 20 and the keel face 21 respective are brought together so that the plastic mould material is squeezed together in a soft state thereby forming a homogeneous connection as shown at strake portions 25 and 26 and keel portion 27 in FIG. 3. The mould assembly is then allowed to cool and harden, after which the inner shell mould 11 is separated from the outer shell mould 12, leaving the completed hull 1 accessible for removal from the outer shell mould 12.

I believe the advantages of my invention to be as follows, however it should be appreciated that all such advantages may not be realized on all embodiments of the invention, and the following list if given by way of example only as being indicative of potential advantages of the present invention. Furthermore, it is not intended that the advantages be restricted to those of the list which follows:

1. The method of forming moulded shells enables homogeneous internal connections to be formed in shell structures such as internal connections at stiffening members between inner and outer shells of boat hulls, thereby reducing the likelihood of failure inherent in connections involving bonded or fastened construction methods.

2. The method enables the rotary moulding process to be used for the production of large size boat hulls and similar heavily loaded structures which require reliable connections between internal stiffening members, thereby enabling the advantages of the rotary moulding process to be realized in the production of such large size structures.

3. By forming a hull of a boat as an integral unit with one or more internal stiffening members formed homogeneously with inner or outer shells of the hull, a reliable hull structure can be achieved overcoming problems of failure at joints inherent in conventional designs with bonded or mechanical jointing methods.

4. Forming the hull as an integral unit reduces construction time compared to other methods where the process of moulding the hull is separate from the process of connecting internal surfaces of the hull together by bonding or mechanical attachment methods.

5. The method enables internal hollow sections to be easily and reliably formed inside a hull of a boat so that girder sections may be designed to provide sealed buoyancy compartments as well as to reinforce the hull.

Aspects of the present invention have been described by way of example only and it will be appreciated that modifications and additions may be made thereto without departing from the scope thereof as defined in the appended claims.

I claim:

1. A method of forming a shell structure using rotary moulding techniques including the steps of:

(a) aligning oppositely disposed moulds having complementary opposed peripheral edges in a spaced apart relationship, with a peripheral gap of predetermined distance d between said opposed peripheral edges, said moulds being shaped with said opposed peripheral edges being complementary, and at least one of said moulds being shaped to create a stiffening member in a shell structure formed on said moulds, (b) said stiffening member being formed at opposed mould surfaces which are initially spaced apart by a distance d+t, where t is a predetermined desired final thickness at a base of said stiffening member, (c) providing a peripheral member which covers said peripheral gap between said peripheral edges of said spaced apart moulds, (d) rotationally moulding a shell from plastic material in a molten state on said opposed surfaces of said moulds and said peripheral member, and (e) advancing said moulds towards each other by said distance d whilst said plastic material is in said molten state so that contact is made between said plastic material in said molten state at said stiffening member to merge and unify said shell with a stiffening member of thickness t, whilst said plastic material in said molten state at said peripheral edges is displaced from said peripheral gap to form a smooth peripheral joint of predetermined thickness with said advancement, thereby forming said shell structure.

2. A method of forming a shell structure as in claim 1 wherein said shell structure comprises a boat hull, said oppositely disposed moulds comprise inner and outer shell moulds for said boat hull, and said inner mould is shaped to create at least one longitudinally stiffening member for said boat hull, comprising the steps of:

(a) aligning said inner shell mould and said outer shell mould in a spaced apart relationship such that said peripheral edges thereof are in alignment and, spaced apart by said gap distance d, (b) providing said peripheral member around a periphery of said inner and outer shell moulds such that said peripheral gap therebetween is covered, said peripheral member being arranged such that said peripheral gap remains covered as said oppositely disposed moulds are advanced towards each other over said predetermined distance d, (c) rotationally moulding a boat hull from said plastic material in said molten state on opposed surfaces of said inner and outer shell moulds and said peripheral member, (d) advancing said inner and outer shell moulds towards each other said distance d whilst said plastic material is in said molten state so that contact is made between said plastic material in said molten state on said inner and outer shell moulds at said stiffening member such that said plastic material in said molten state becomes homogeneous and is of said thickness t to form said stiffening member following contact, whilst said plastic material in said molten state at said peripheral edges is displaced with said advancement to form said smooth peripheral joint, (e) allowing said moulds to cool, (f) separating said inner and outer shell moulds leaving said boat hull supported in one or other of said moulds, and (g) removing said boat hull from said mould.

3. A method of forming a boat hull according to claim 2 wherein said peripheral member comprises inner and outer plates, said inner plate being attached to said inner shell mould and said outer plate being attached to said outer shell mould, said plates being arranged so as to slide relative to each other as said inner and outer shell moulds are advanced towards each other.

4. A method of forming a boat hull according to claim 3 wherein said method further comprises the step of sealing between said inner and outer peripheral plates with a sealant prior to said step of moulding said boat hull from said plastic material in said molten state.

5. A method of forming a boat hull according to claim 4 wherein said inner peripheral plate is formed with a shaped member which faces an inner surface of said outer peripheral plate.

6. A method of forming a boat hull according to claim 5, wherein said shaped member of said inner peripheral plate, said outer peripheral plate and said peripheral edge of said outer mould, cooperatively squeeze said plastic material in said molten state at said opposed peripheral edges of said inner and outer moulds to form said smooth peripheral joint.

7. A method of forming a boat hull according to claim 5, wherein said shaped member is in the form of an inclined edge which forms a peripheral flange.

8. A method of forming a reinforced boat hull shell structure from oppositely disposed moulds which comprise inner and outer shell moulds for said boat hull, and said outer shell mould including interior and exterior surfaces and said inner shell mould being shaped to create at least one longitudinal stiffening member for said boat hull, which stiffening member extends between said inner shell mould and said interior surface of said outer shell mould including the steps of:

(a) aligning said inner shell mould and said outer shell mould in a spaced apart relationship such that peripheral portions thereof are in alignment and spaced apart by a peripheral gap of predetermined distance, (b) providing a peripheral member around a periphery of said inner and outer shell moulds such that said peripheral gap therebetween is covered, said peripheral member being arranged such that said oppositely disposed moulds may be advanced towards each other over said predetermined distance, (c) providing a stiffening member forming surface on said inner shell mould and a complementary receiving surface therefor on said interior surface of said outer shell mould which is opposite said stiffening member forming surface, (d) rotationally moulding a boat hull from plastic material in a molten state on said opposed surfaces of said inner and outer shell moulds and said peripheral member, and (e) advancing said inner and outer shell moulds towards each other said predetermined distance whilst said plastic material is in said molten state so that contact is made between said plastic material in said molten state on said stiffening member forming surface of said inner shell mould and said complementary receiving surface on said interior surface of said outer shell mould, such that said plastic material in said molten state becomes homogeneous at said opposed contact surfaces to form said stiffening member between said opposed contact surfaces, while said plastic material in said molten state at said periphery is displaced from said peripheral gap to form a peripheral joint of predetermined thickness, thereby forming said reinforced boat hull shell structure.

9. A method of forming a shell structure according to claim 8 wherein:

(a) said peripheral member is spaced a preselected distance from inner surfaces of said inner and outer shell moulds with said preselected distance being orthogonal to said predetermined distance, (b) providing a flange within said preselected distance, extending from one of said shell moulds, with said flange, peripheral member and peripheral portions of said shell moulds meeting at a peripheral juncture, (c) forming a flexible seal at said peripheral juncture to prevent leakage of said plastic material in said molten state at said peripheral member during moulding prior to said advancement of said inner and outer shell moulds to close said peripheral gap, and (d) displacing excess molten plastic material at said peripheral member and flange, immediately adjacent said peripheral member, to form a peripheral joint of a predetermined thickness at said peripheral juncture.

10. A method of forming a reinforced boat hull shell structure according to claim 8 wherein said inner shell mould is shaped to provide at least two stiffening member forming surfaces to form at least two longitudinal stiffening members.

11. A method of forming a reinforced boat hull shell structure according to claim 9, wherein said flange is in the form of an edge which is inclined to face outwards.

12. A method of forming a shell structure using rotary moulding techniques including the steps of:

(a) aligning oppositely disposed inner and outer shell moulds in a spaced apart relationship, said moulds having inner surfaces, being shaped with complementary peripheral edges, and one or both of said moulds being shaped to create a stiffening member in a shell structure formed therebetween, (b) providing a peripheral member spaced at a preselected distance from said inner surfaces of said inner and outer shell moulds, and a flange extending from one of said shell moulds, (c) forming a flexible seal at a juncture of said peripheral member, said flange, and said peripheral edges of said shell moulds to prevent leakage of plastic material in a molten state adjacent said peripheral member during rotational moulding, (d) rotationally moulding a shell from said plastic material in said molten state on said inner surfaces of said oppositely disposed moulds and said peripheral member, and (e) advancing said inner and outer moulds towards each other while applying said plastic material in said molten state to said inner surfaces of said shell moulds to form said stiffening member, while predeterminedly displacing excess plastic material between said peripheral member and said flange immediately adjacent said peripheral member to form a peripheral joint, thereby forming said shell structure.

13. A method of forming a shell structure according to claim 12 wherein said shell structure comprise a hull and said oppositely disposed moulds comprise inner and outer shell moulds for said hull, and said inner mould is shaped to create at least one longitudinal stiffening member for said hull, including the steps of:

(a) aligning said inner shell mould and said outer shell mould in a spaced apart relationship such that peripheral portions thereof are in alignment, (b) providing said peripheral member around a periphery of said inner and outer shell moulds such that a peripheral gap therebetween is covered, said peripheral member being arranged such that said oppositely disposed moulds may be advanced towards each other over a predetermined distance, (c) moulding a hull from said plastic material in said molten state on opposed inner surfaces of said inner and outer shell moulds and said peripheral member, and (e) advancing said inner and outer shell moulds towards each other to close said peripheral gap whilst said plastic material is in said molten state so that contact is made between said plastic material in said molten state on said inner and outer shell moulds at a location of said stiffening member, such that said plastic material in said molten state becomes homogeneous at such contact, whilst excess plastic material at said peripheral edges is predeterminedly displaced towards said inner surfaces of said inner and outer shell moulds at said peripheral member.

14. A method of forming a shell structure according to claim 12 wherein said inner shell mould is shaped to provide at least two longitudinal stiffening members.

15. A method of forming a reinforced plastic boat hull structure using rotary moulding techniques, including the steps of:

(a) providing a pair of opposed inner and outer shell moulds, said inner shell mould including interior and exterior surfaces, and said inner shell mould including a plurality of stiffening member forming surfaces extending towards complementary receiving surfaces at said interior surface of said outer shell mould, (b) aligning said pair of moulds in spaced apart relationship by a predetermined distance, (c) rotationally moulding a shell from plastic material in a molten state on opposed surfaces of said spaced apart inner and outer shell moulds, and (d) advancing said moulds towards each other whilst said plastic material is in said molten state so that contact is made between said plastic material in said molten state on said stiffening member forming surfaces of said inner mould and said complementary receiving surfaces of said outer mould, such that said plastic material in said molten state becomes homogeneous at said contact to form stiffening members between said inner shell mould and said interior surface of said outer shell mould, said inner shell mould further including surfaces defining spaced webs extending from ends of said stiffening members and defining freely extending flanges connecting said webs, thereby forming hollow structures between said stiffening members, thereby forming said reinforced plastic boat hull structure.

16. A method of forming a reinforced plastic boat hull structure according to claim 15, wherein said inner shell mould is shaped to provide a plurality of longitudinal stiffening members on opposite sides of a keel.

17. A method of forming a reinforced plastic boat hull structure according to claim 15, wherein said pair of shell moulds are shaped such that said homogeneous plastic material forming portions of said stiffening members at said interior surface of said outer shell mould is thicker than said plastic material forming said freely extending flanges.

18. A method of forming a reinforced plastic boat hull structure according to claim 15, wherein at least some of said stiffening member forming surfaces are coincident with a strake forming portion of said outer mould.

19. A method of forming a reinforced shell structure using rotary moulding techniques, including the steps of:

(a) providing a pair of opposed inner and outer shell moulds, said outer shell mould including interior and exterior surfaces, said inner shell mould including a plurality of stiffening member forming extensions, each having a projecting portion which extends towards said outer shell mould and a base forming surface at its terminus which is opposed to a complementary receiving surface at said interior surface of said outer shell mould, (b) aligning said pair of moulds in spaced apart relationship by a predetermined distance such that there is a gap of predetermined extent between said stiffening member base forming surfaces of said inner mould and opposed complementary receiving surfaces at said interior surface of said outer mould, (c) rotationally moulding a shell from plastic material in a molten state of a desired coating thickness on opposed surfaces of said spaced apart inner and outer shell moulds, and (d) advancing said moulds towards each other whilst said plastic material is in said molten state to close said gap so that contact is made between said plastic material in said molten state on said stiffening member base forming surfaces of said inner mould and said complementary receiving surfaces above said interior surface of said outer mould, such that said plastic material in said molten state becomes homogeneous at said contact surfaces to form stiffening members having bases of a predetermined thickness at said interior surface of said outer shell mould, said predetermined thickness being dependent upon said coating thickness of said plastic material on said inner and outer moulds, thereby forming said reinforced shell structure, each said stiffening member including integral connecting portions extending from its base towards said inner shell mould along said projecting portion of said stiffening member extension, said inner shell mould further defining freely extending flanges connecting ends of said connecting portions, thereby forming hollow structures between said stiffening member bases.

20. A method of forming a boat hull shell structure from oppositely disposed moulds which comprise inner and outer shell moulds for said boat hull, including the steps of:

(a) aligning said inner shell mould and said outer shell mould in a spaced apart relationship such that peripheral portions thereof are in alignment and spaced apart by a peripheral gap of predetermined distance, (b) providing a peripheral member around a periphery of said inner and outer shell moulds such that said peripheral gap therebetween is covered, said peripheral member being arranged such that said oppositely disposed moulds may be advanced towards each other over said predetermined distance, (c) said peripheral member being spaced a preselected distance from inner surfaces of said inner and outer shell moulds, with said preselected distance being orthogonal to said predetermined distance, (d) providing a flange within said preselected distance, which extends from one of said shell moulds to the other of said shell moulds, (e) forming a flexible seal at a juncture of said flange, said peripheral member, and said shell moulds, (f) rotationally moulding said boat hull from plastic material in a molten state on opposed inner surfaces of said inner and outer shell moulds and on said peripheral member, with said flexible seal preventing leakage of said plastic material in said molten state at said peripheral member during moulding prior to advancement of said inner and outer shell moulds to close said peripheral gap, and (g) advancing said inner and outer shell moulds towards each other over said predetermined distance to close said peripheral gap whilst said plastic material is in said molten state, displacing excess plastic material in said molten state at said peripheral member and said flange, immediately adjacent said peripheral member, to form a peripheral joint of a predetermined thickness at a juncture of said inner and outer shell moulds, thereby forming said boat hull shell structure.

21. A method of forming a boat hull structure according to claim 20, wherein said flange is in the form of a wedge integral with said inner shell mould inclined to face outwards towards said peripheral member.

* * * * *